United States Patent
Badding et al.

(10) Patent No.: US 7,314,678 B2
(45) Date of Patent: Jan. 1, 2008

(54) SOLID OXIDE FUEL CELL DEVICE WITH A COMPONENT HAVING A PROTECTIVE COATINGS AND A METHOD FOR MAKING SUCH

(75) Inventors: Michael E Badding, Elmira, NY (US); Peter J Kalal, Corning, NY (US); Raja R Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 490 days.

(21) Appl. No.: 10/648,415

(22) Filed: Aug. 25, 2003

(65) Prior Publication Data

US 2005/0048357 A1    Mar. 3, 2005

(51) Int. Cl.
  *H01M 8/10*   (2006.01)
  *H01M 2/00*   (2006.01)
  *H01M 2/02*   (2006.01)
(52) U.S. Cl. .......................................... 429/30; 429/34
(58) Field of Classification Search .................. 429/30, 429/137, 34
  See application file for complete search history.

(56) References Cited

U.S. PATENT DOCUMENTS

| 5,089,455 | A |   | 2/1992  | Ketcham et al. ............ 501/104 |
| 5,273,837 | A |   | 12/1993 | Aitken et al. ................. 429/30 |
| 5,519,191 | A |   | 5/1996  | Ketcham et al. ............ 219/552 |
| 5,733,682 | A | * | 3/1998  | Quadakkers et al. ........ 429/210 |
| 6,045,935 | A |   | 4/2000  | Ketcham et al. ............... 429/30 |
| 6,444,340 | B1|   | 9/2002  | Jaffrey .......................... 429/30 |
| 2002/0102450 | A1 |   | 8/2002 | Badding et al. .............. 429/32 |
| 2002/0127460 | A1 | * | 9/2002 | Pham et al. ................... 429/34 |
| 2003/0096147 | A1 | * | 5/2003 | Badding et al. .............. 429/30 |

FOREIGN PATENT DOCUMENTS

| DE |       29807832 |  7/1998 |
| EP |      1 113 518 |  7/2001 |
| WO |     WO97/23006 |  6/1997 |
| WO |     WO00/76015 | 12/2000 |
| WO |   WO 02/088434 | 11/2002 |

OTHER PUBLICATIONS

The Random House College Dictionary, 1975, Random House Inc., Revised Edition, Section F, p. 524.*

(Continued)

*Primary Examiner*—Patrick Joseph Ryan
*Assistant Examiner*—Helen Oi Kun Chu
(74) *Attorney, Agent, or Firm*—Svetlana Z. Short

(57) ABSTRACT

A solid oxide fuel cell device comprises: (a) zirconia based electrolyte; (b) at least one ectrode situated on the electrolyte; (c) a component situated in close proximity to the electrolyte, the component comprising at least one metal or metal oxide capable, at temperatures of above 625° C., of: (i) migrating to the surface of this component, and (ii) being re-deposited on said at least one electrode; and (d) a protective coating situated on at least one surface of this component. The protective coating substantially prevents the at least one metal or metal oxide from leaving the surface of the component, which is situated under said protective coating. The protective coating is also being substantially impermeable to oxygen.

21 Claims, 3 Drawing Sheets

OTHER PUBLICATIONS

Minh, N.Q., "Ceramic Fuel Cells", Journal of the American Ceramic Society., vol. 76, No. 3, pp. 563-588 (1993).

Blum et al, "Multi-kW-SOFC Development at Siemens", Solid Oxide Fuel Cells IV, pp. 163-172, 1995.

Piron et. al., "Ferritic Steel Interconnect for Reduced Temperature SOFC", Solid Oxide Fuel Cells VII, pp. 811-819, 2001.

Metals Handbook, The American Society for Metals, 1948 Edition, pp. 553-556.

Miyake et al, "Development of a Planar Solid Oxide Fuel Cell Module at Sanyo", Solid Oxide Fuel Cells (1995), p. 100-109.

Norton, Robert L., "Designing to Avoid Stress Concentrations", Machine Design, An Integrated Approach, Section 2, p. 235, 1998.

Timoshenko et al., "Elements of Strength of Materials", p. 29, 1940.

J. Den Hartog, "Advanced Strength of Materials", p. 48, 1952.

Yasuda et al. "Development of Anode-Supported SOFC for Reduced-Temperature Operation", 2000 Fuel Cell Seminar, 2000, Oregon.

Matsuzaki, et al, "Electrochemical properties of a SOFC cathode in contact with a chromium-containing alloy separator", Solid State Ionics, 132, 2000, 271-278.

Jiang, et al., "A comparative investigation of chromium deposition at air electrodes of solid oxide fuel cells", Journal of the European Ceramic Society 22, 2002, 361-373.

Matsuzaki, et al., "Dependence of SOFC Cathode Degradation by Chromium-containing Alloy on Compositions of Electrodes and Electrolytes", Journal of The Electrochemical Society, 148 (2) A126-A131, 2001.

ASM Handbook, vol. 5, Surface Engineering, Anodizing, p. 482-493.

Metals Handbook, Desk Edition, 16-Heat-Resistant Materials. 16-1.

Peckner, et al., Handbook of Stainless Steels, A1-56.

Peckner, et al., Handbook of Stainless Steels, 17-16, Corrosion Resistance.

\* cited by examiner

Anodized Sample Surface

50X BSE Image

200X BSE Image

500X BSE Image 2,000X BSE Image

Oxidized Sample - Surface
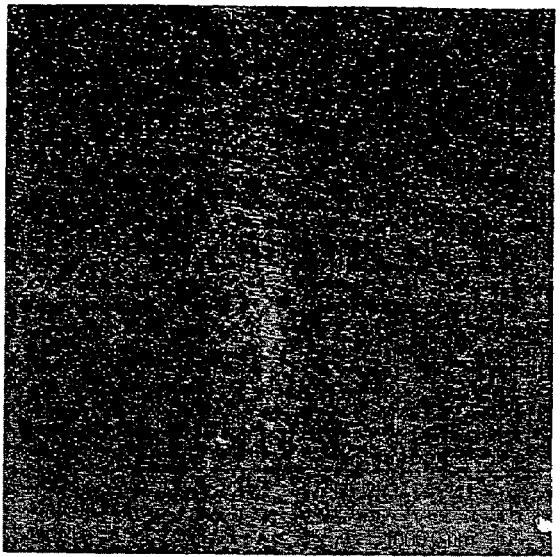
50X BSE Image  Fig 3A
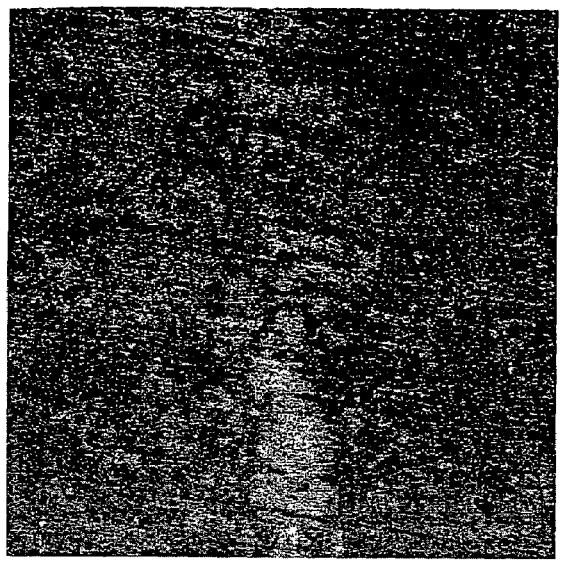
200X BSE Image  Fig 3B
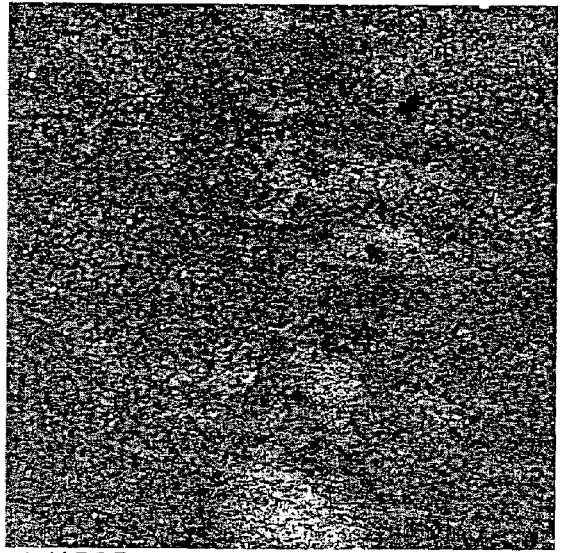
500X BSE Image  Fig. 3C
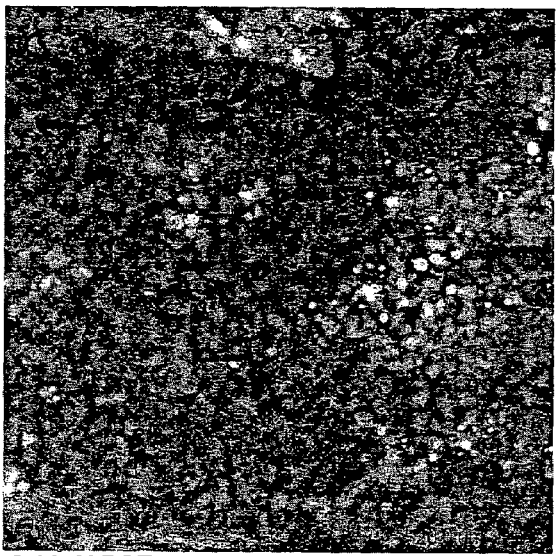
2,000X BSE Image  Fig. 3D

SOLID OXIDE FUEL CELL DEVICE WITH A COMPONENT HAVING A PROTECTIVE COATINGS AND A METHOD FOR MAKING SUCH

BACKGROUND OF THE INVENTION

1. Field of the Invention

The present invention relates generally to coatings on metal components that are suitable for use in fuel cell devices, and particularly to protective coatings on stainless steel frames for supporting electrolytes in solid oxide fuel cell devices.

2. Technical Background

The use of solid oxide fuel cells has been the subject of considerable amount of research in recent years. The typical components of a solid oxide fuel cell (SOFC) comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

It is known that substrate type solid oxide fuel cells sometimes utilize metal alloys as separators. Such configuration is described, for example, in the article entitled "Electromagnetic properties of a SOFC cathode in contact with a chromium-containing alloy separator", by Yoshido Matsuzaki and Isami Yasuda, Solid State Ionics 132 (2000) 271-278. This article describes that when chromium-forming alloys are used as separators, the performance of SOFC cathodes rapidly degrades due to "Cr poisoning".

The article entitled "Dependence of SOFC Cathode Degradation by Chromium-Containing Alloy on Compositions of Electrodes and Electrolytes", by Yoshido Matsuzaki and Isami Yasuda, Journal of Electrochemical Society, 148 (2) A126-A131 (2001) also describes the problem of "Cr poisoning". More specifically, the article states that "it should be of concern that chromium oxyhydroxide vapor generated from an oxide scale ($Cr_2O_3$), which is formed on the surface of most high temperature resistant alloys, degrades the performance of cathode under polarization." The article states that the amount of degradation was found to depend on the composition of the electrolyte on which the electrode was prepared. The article then suggests, in order to reduce Cr poisoning, to use $La_{0.6}Sr_{0.4}Fe_{0.8}O_3$ and $Ce_{0.8}Sm_{0.2}O_{1.9}$ as the electrode and electrolyte respectively.

The article entitled "A comparative investigation of chromium deposition at air electrodes of solid oxide fuel cells", by S. P. Jiang, et al., Journal of European Ceramic Society (2002) 361-373 also describes the problem of Cr deposition on electrodes. More specifically, the article states that "Deposition process of chromium (Cr) species were investigated for the $O_2$ reduction on (La, Sr)$MnO_3$ (LSM), Pt and (La, Sr) (Co, Fe)$O_3$ (LSCF) electrodes in presence of chromium-forming alloy interconnect at 900° C. under air flow. For the reaction on LSM electrodes, deposition of Cr species preferentially occurred on the zirconia electrolyte surface, forming a distinct deposit ring at the edge of the LSM electrode while at LSCF electrodes, Cr species deposited on the electrode and electrolyte surface, forming isolated Cr particles. In contrast, there was no detectable deposition of Cr species either on the electrode and electrolyte surface for the $O_2$ reduction on Pt electrodes." That is, this article also suggests that in order to eliminate or reduce problems associated with Cr deposition on electrolyte/electrode surfaces, one is limited to making electrode/electrolyte from specific materials.

It is known that at sufficient temperatures (e.g., about 725° C. and above), yttria stabilized zirconia YSZ ($Y_2O_3$-$ZrO_2$) electrolytes exhibit good ionic conductance and very low electronic conductance. U.S. Pat. No. 5,273,837 describes the use of such compositions to form thermal shock resistant solid oxide fuel cells.

US Patent Publication US2002/0102450 describes solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in electrolyte sheet. The vias are filled with electronically conductive materials (via interconnects).

SUMMARY OF THE INVENTION

One aspect of the invention a solid oxide fuel cell device comprises:
  (a) zirconia based electrolyte;
  (b) at least one electrode situated on the electrolyte;
  (c) a component situated in close proximity to the electrolyte, the component comprising at least one metal or metal oxide capable, at temperatures of above 625° C., of:
    (i) migrating to the surface of this component, and
    (ii) being re-deposited on said at least one electrode; and
  (d) a protective coating situated on at least one surface of this component. The protective coating substantially prevents the at least one metal or metal oxide from leaving the surface of the component, which is situated under said protective coating. The protective coating is also being substantially impermeable to oxygen.

In another aspect, the present invention includes a method of making a solid oxide fuel cell device which comprises the steps of:
  (a) providing a zirconia based electrolyte having at least one cathode situated on said electrolyte; and
  (b) providing a component having a protective coating on at least one surface of said component, said component being situated in close proximity to said electrolyte, said component comprising at least one metal or capable of, at temperatures of above 625° C., in absence of said protective coating: (i) migrating to said surface of said component, and (ii) being re-deposited as said metal or an oxide of said metal on said at least one cathode; and wherein protective coating substantially prevents said at least one metal from leaving said surface, said coating also being substantially impermeable to oxygen.

According to one embodiment of the present invention the step of providing a component having a protective coating on at least one surface further comprises: (i) coating a surface of said component with 1 μm to 100 μm coating that when oxidized will become impenetrable to oxygen; (ii) oxidizing this coating to obtain said protective coating.

One advantage of the solid oxide fuel cell device of the present invention that utilizes a protective coating is that that it provides improved performance due to minimization of undesired metal release, for example Cr, from the surface of metal containing component. Such metal containing component may be, for example, a stainless steel frame for supporting electrolyte, an interconnect, or a metal alloy separator utilized in a fuel cell device. According to one embodiment of the present invention the protective coating is an aluminum oxide coating with the thickness of 1 μm to 100 μm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 3A-3D are surface photographs of an thermally oxidized alumina oxide coating (on 446 stainless steel) at 50×, 200×, 500× and 2000× magnification, respectively.

DETAILED DESCRIPTION OF THE PREFERRED EMBODIMENTS

Figure 1:
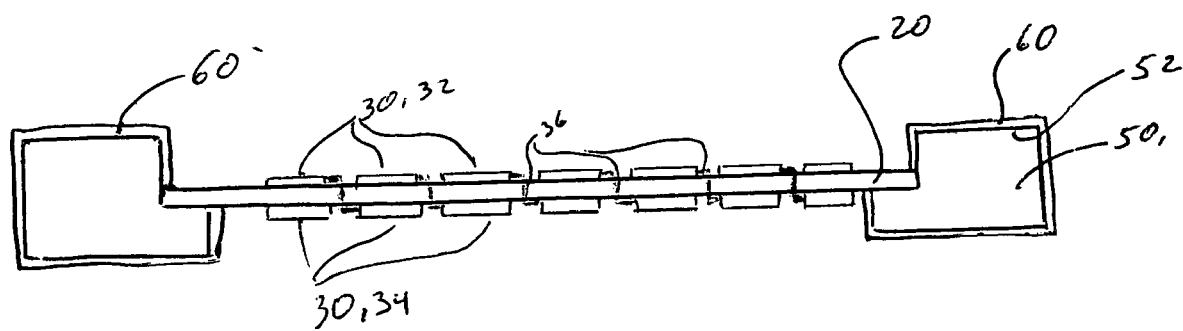
FIG. 1 is a schematic cross-sectional view of one embodiment of the present invention.

Reference will now be made in detail to the present preferred embodiment(s) of the invention, examples of which are illustrated in the accompanying drawings. Whenever possible, the same reference numerals will be used throughout the drawings to refer to the same or like parts.

One embodiment of the solid oxide fuel cell device of the present invention is shown in FIG. 1, and is designated generally throughout by the reference numeral 10. The solid oxide fuel cell device 10 comprises: (a) zirconia based electrolyte 20; (b) at least one electrode 30 situated on the electrolyte; and (c) a component 50 situated in close proximity to the electrolyte 20. This component 50 comprises at least one metal or metal oxide capable, at temperatures of above 625° C., of: (i) migrating to a surface 52 of this component, and (ii) being re-deposited on the electrode(s) and/or other components. A protective coating 60 is situated on the surface 52 of this component 50. The protective coating 60 substantially prevents the one metal or metal oxide from leaving the surface 52 of the component 50, which is situated under said protective coating 60. The protective coating 60 is also being substantially impermeable to oxygen.

EXAMPLES

The invention will be further clarified by the following examples.

Example 1

A solid oxide fuel cell device 10 shown in FIG. 1 includes: (a) yttria-stabilized zirconia (YSZ) electrolyte sheet 20; (b) a plurality of electrodes 30 situated on the electrolyte sheet 20, including at least one cathode 32; and (c) a metal frame 50 supporting the electrolyte sheet 20 and the electrodes 30 attached thereto. In this embodiment the electrolyte sheet 20 supports a plurality of cathode 32-anode 34 pairs and has a plurality of via holes filled with via interconnects 36.

It is preferable that the frame 50 and the electrolyte sheet 20 have similar coefficients of thermal expansion (CTE). Thus, because zirconia based electrolytes have a CTE of $11.4 \times 10^{-6}/°$ C., it is preferable that the frame 50 has a CTE in the range of $10 \times 10^{-6}/°$ C. to $12.5 \times 10^{-6}/°$ C. It is more preferable that the CTE of the frame 50 be in the $11 \times 10^{-6}/°$ C. to $12 \times 10^{-6}/°$ C. range and most preferable that it is in $11.2 \times 10^{-6}/°$ C. to $11.7 \times 10^{-6}/°$ C. range. In this example the metal frame 50 i manufactured from the stainless steel 446 which has a CTE $11.6. \times 10^{-6}/°$ C. This stainless steel is an alloy of several metals, including Cr. However, when the stainless steel frame 50 is subjected to at temperatures of above 625° C. in an oxygen rich environment, in absence of the protective coating 60, Cr migrates to the surface of the frame 50, oxidizes to form $Cr_2O_3$ and reacts with oxygen and water vapor to form Cr based vapor ($Cr_2O_3 + 1.5 O_2 + 2 H_2O$ forms $CrO_2(OH)_2$ vapor). During the operation of a fuel cell (in the absence of the protective coating 60 on the stainless steel frame 50), the frame and the cathodes 32 are exposed to oxygen $O_2$ rich environment (anodes are exposed to hydrogen fuel and, therefore, are not effected to the same degree). The Cr based vapor $CrO_2(OH)_2$ is then deposited on the cathode/electrolyte interface (and other portions of the device) and degrades the performance of the solid oxide fuel cell device. In order to overcome this problem, applicants utilized a protective coating 60 that covers at least one surface 52 of the frame 50. The protective coating 60 of this example is a non-electrically conductive aluminum oxide ($Al_2O_3$) coating. In this example, the frame 50 does not provide an electrical function. In this case, and others where the component 50 does not function as an electrical connector, it is advantageous for the protective coating 60 to be non-conductive. In this way potential electrical shorting among various fuel cell components may be avoided. Furthermore, coating 60 acts as a barrier and prevents Cr from leaving surface 52 of the metal frame 50. Because the protective coating 60 is also substantially impermeable to Cr and to oxygen ions, it prevents oxidation of Cr and thus the formation of chromium oxide $Cr_2O_3$. Therefore the protective coating 60 prevents $Cr_2O_3$ (also referred to as chrome herein) from being deposited on other fuel cell components (for example, electrolyte, cathodes, via interconnects) and from interfering with their functions, allowing optimum functionality.

Example 2

The aluminum oxide protective coating 60 may be produced by several methods. For example, it may be produced electrochemical oxidation of aluminum metal. Aluminum metal is first electrodeposited (using a nickel strike) on the component 50, for example stainless steel frame of example 1. An aluminum coating can be electroplated from inorganic and organic fused salt mixtures and from solutions of aluminum in certain organic solvents. Commercial aluminum electroplating services are available, for example, from AlumiPlate, Inc. of 8960 Springbrook Dr., Minneapolis, Minn. 55433-5874 USA.

In this example, a Ni strike was utilized to enable better aluminum coating of the 446 stainless steel. Subsequently, the aluminum (Al) coating is electrochemically oxidized (anodized) to aluminum oxide. Alternatively, aluminum oxide coating may be created by electroplating and subsequent thermal oxidation of Al coating. Whereas anodizing is typically associated with aluminum, similar processes may be used for other base metals, including magnesium, titanium, and zinc. These metals may also form protective coatings 60.

Anodizing aluminum can be accomplished in a wide variety of electrolytic solutions, employing varying operating conditions including concentration and composition of the electrolytic solutions, presence of any additives, temperature, voltage, and amperage. The three principal types of anodizing processes are: (a) chromic processes using chromic acid as the electrolyte, (b) sulfuric processes performed at room temperature, and (c) hard anodizing processes that utilizes sulfuric acid alone or with additives, typically performed at low temperatures (0° C. or less).

For this embodiment of the present invention we utilized the hard anodizing process. The primary difference between the sulfuric acid and hard anodizing processes are the operating temperature, the use of additives, and the voltage and current density at which anodizing is accomplished. The hard anodizing process, also referred to as hard coat or type III anodizing, produces a considerable heavier coating then conventional sulfuric acid anodizing. In our experiment, we were able to produce alumina coatings of up to 100 micrometers thick. In this embodiment we anodization was performed at temperatures between 0 to 10 degrees C. and with a current density between 20 and 35 mA/cm$^2$. The resulting voltage in the galvanostatic mode can reach up to 100 volts towards the end of the process. If original aluminum metal layer is of high quality, this process results in high quality aluminum oxide layers with high density (low or zero porosity). FIGS. 2A-2D are the surface photographs of a 100 μm thick electrochemically generated alumina oxide coating (on 446 stainless steel) at 50×, 200×, 500× and 2000× magnification, respectively. Because the coating is relatively thick one can see the presence of very fine cracks in the coating. The bright areas of the photographs indicate the presence of Cr, Ni and Fe. FIGS. 2C and 2D illustrate chromium formation along a small (same) section of one of these cracks. A thinner protective coating 60 would be less likely to crack, and is, therefore, preferred.

Figure 2A:
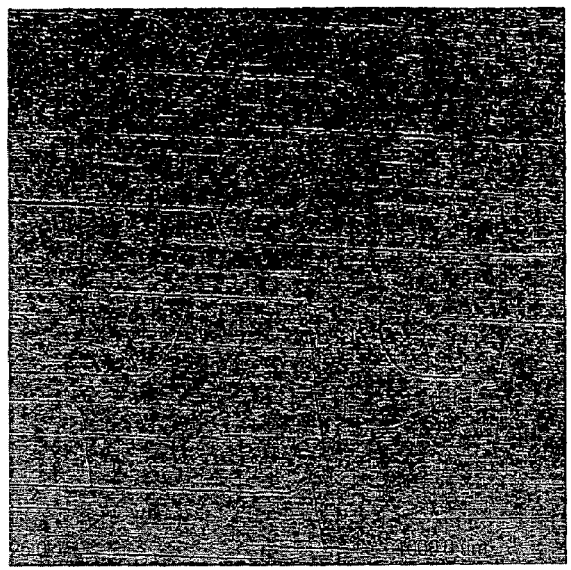
FIGS. 2A-2D are surface photographs of an electrochemically generated alumina oxide coating (on 446 stainless steel) at 50×, 200×, 500× and 2000× magnification, respectively.
Figure 2B:
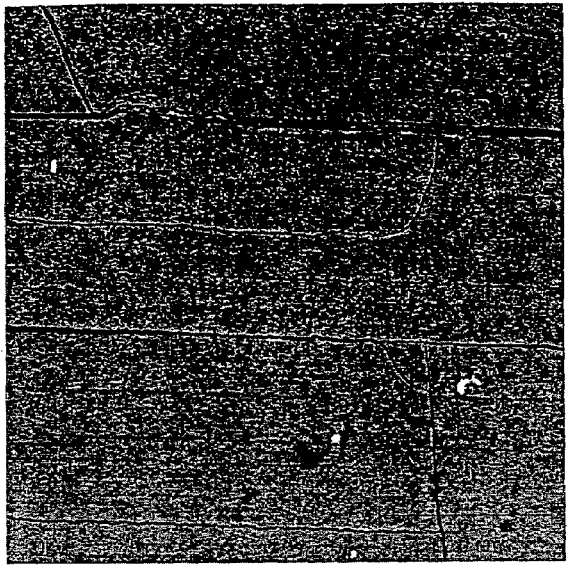
Figure 2C:
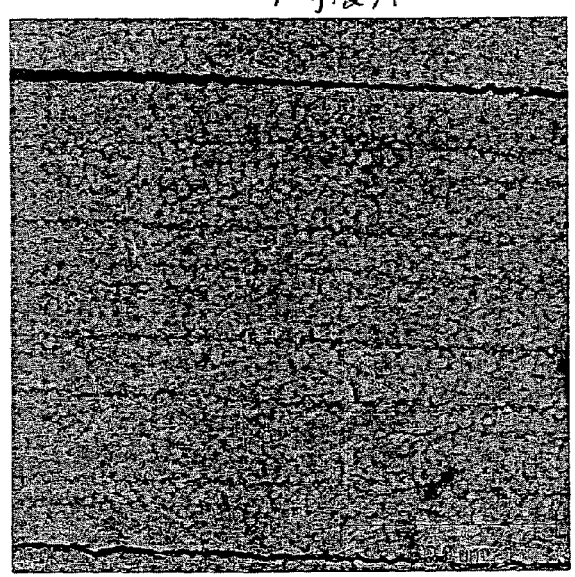
Figure 2D:
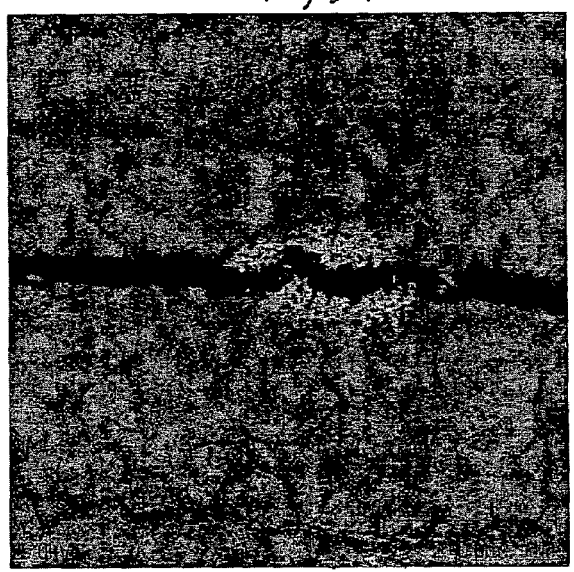

FIG. 2A shows very few bright chrome containing areas. Therefore, it illustrates that most of the coating surface does not contain chromium even in the presence of these cracks. Thus, alumina oxide coating generated by electrochemical oxidation of aluminum layer solves the problem of oxidation of the stainless steel hardware within the solid oxide fuel cell stack. Its existence prevents chromium loss and subsequent re-deposition on other cell parts with all the negative consequences for cell performance.

Another method to produce aluminum oxide coating is via oxidation of aluminum layer on top of the substrate (for example, the 446 stainless steel) is thermal oxidation. This method exposes an aluminum layer to oxygen at high temperature (800° C.) for appropriate duration of time (1-5 hours). FIGS. 3A-3D are the surface photographs of a 10-20 μm thick almina (i.e., aluminum oxide) coating (on 446 stainless steel) generated by thermal oxidation at 50×, 200×, 500× and 2000× magnification, respectively. This is also a very good coating with only a few bright areas indicating the presence of Cr, Ni and Fe. (See FIG. 3A.) During this process, due to high temperatures, some of the aluminum diffuses into the steel, possibly preventing crack formation and creating better adhesion. A combination of two methods (partial electro chemical anodizing, followed by thermal oxidation) might avoid cracks, provide better adhesion, while allowing virtually no Cr to penetrate through the protective coating 60.

More specifically the two processes were compared using identical original aluminum coating (100 micron thick). Both methods yielded good results. The effectiveness of the protective coating 60 is judged by the amount of Cr found on the alumina surface after an exposure to high temperature (800° C.), for 1 to 5 hours. The protective coatings 60 prevented chrome from being formed on the surface of the frame 50. Thus, because of the protective coating 60, little or no chrome ($Cr_2O_3$) will be deposited on the electrodes. It is preferable that at least 70% of the coated surface area and thus at least 70% of cathode or/and electrolyte surface(s) of oxide fuel cell device is not covered by chrome. It is more preferable that at least 85% of the coated surface area and thus at least 85% of the electrolyte surface(s) is not covered by chrome. It is even more preferable that at least 90% of the coated surface area and thus at least 90% of cathode or/and electrolyte surface(s) is not covered by chrome It is most preferable that at least 98% of the coated surface area and thus 98% of the cathode surface is not covered by chrome.

Applicants also found that there is a minimum thickness of the non-electrically conductive alumina coating necessary to accomplish the desired protection. We have tested a 0.5 micrometers alumina coating. The thinner alumina coating is not sufficient to protect the steel surface from forming chromium oxide. An aluminum oxide coating that is too thick may crack during the heat cycling because aluminum's coefficient of thermal expansion (CTE) is much different from that of stainless steel. However, a thin aluminum oxide coating is pliable and does not crack easily during heat cycling. Thus, a compromise thickness needs to be selected in order to for the coating to be protective and, at the same time, not too thick to crack upon heat cycling. Therefore, it is preferable that the thickness of the protective coating 60 be between 1 and 100 microns. It is preferable that the coating thickness be below 30 microns. It is more preferable that the coating thickness be between 1 and 20 microns and even more preferable that the coating thickness be between 5 and 20 microns. The optimum thickness appears to be around 10 microns.

Iron-chromium-aluminum alloys (such as, for example stainless steel 406) will also generate an aluminum oxide coating upon oxidation and thus provide protective coating to prevent chromium from coming to the surface. However iron-chromium-aluminum alloys have higher thermal expansion than the zirconia elctrolyte as shown in the following table and thus may be unsuitable for use as components in some fuel cell configurations, such as a frame utilized in the solid oxide fuel cell of FIG. 1.

Table 1 provides CTE for some of these materials.

TABLE 1

| Material | CTE |
| --- | --- |
| $ZrO_2$ electrolyte | $11.4 \times 10^{-6}$/° C. |
| Fe-20% Cr 446 stainless steel | $11.6 \times 10^{-6}$/° C. |
| Fe-20% Cr-5% Al alloys | $14.5 \times 10^{-6}$/° C. |

Other protective coatings, such as glass or zirconia based coatings may also be utilized. These coatings are also substantially impermeable to oxygen ions and prevents oxidation of Cr and formation of chromium oxide $Cr_2O_3$. An example of such coating is a metal oxide (e.g. $ZrO_2$, $Al_2O_3$, YSZ) based coating formed in the following manner: (i) applying the metal oxide (e.g. $ZrO_2$, $Al_2O_3$, YSZ) powder suspended in a solvent, for example amyl acetate, by sponging, painting, or dipping; (ii) optionally utilizing a doctor blade to ensure coating uniformity; (iii) sintering to create a hard protective coating 60. Another method for applying such coating is plasma spraying—optionally followed by a sintering step.

In accordance with the invention, the present invention for a method of making a solid oxide fuel cell device includes the steps of:
(a) providing a zirconia based electrolyte 20 having at least one cathode 32 situated on said electrolyte;
(b) providing a component 50 having a protective coating 60 on at least one surface 52 of this component, the said coating 60 is substantially impermeable to oxygen ions.
(c) The component 50 being situated in close proximity to the electrolyte 60. The component 50 comprises at least one metal 70 capable, at temperatures of above 625° C., in absence of said protective coating, of:
  (i) migrating to said surface of this component 50, and
  (ii) being re-deposited as said metal or an oxide of this metal on the cathode 32; and wherein protective coating substantially prevents the metal or the oxide of said metal from leaving surface 52.

According to one embodiment the step of providing a component having a protective coating 60 on at least one surface 52 further comprises: (i) coating surface 52 with 1 μm to 100 μm coating that, when oxidized, will become impenetrable to oxygen; (ii) oxidizing this coating to obtain said protective coating 60.

According to one example the oxidation step is electrochemical oxidation (anodizing). According to another example, the oxidation step is thermal oxidation. According to one example, the coating step includes depositing aluminum on the surface and thermal oxidation step results in a dense aluminum oxide coating.

It will be apparent to those skilled in the art that various modifications and variations can be made to the present invention without departing from the spirit and scope of the present invention. Thus it is intended that the present invention cover the modifications and variations of this invention provided they come within the scope of the appended claims and their equivalents.

What is claimed is:

1. A solid oxide fuel cell device comprising:
   (a) zirconia based electrolyte;
   (b) at least one electrode situated on said electrolyte;
   (c) a non-electrically active component wherein the component is not in contact with electrodes and thereby not conductive and said component comprising at least one metal or metal oxide capable of, at temperatures of above 625° C.,
      (i) migrating to the surface of said component, and
      (ii) being re-deposited on said at least one electrode; and
   (d) the electrolyte comprises an edge, said electrolyte edge situated over the non-electrically active component
   (e) a protective coating situated on at least one surface of said component, said coating substantially preventing said at least one metal or metal oxide from leaving the surface, of said component, which is situated under said protective coating, said protective coating also being substantially impermeable to oxygen, wherein said protective coating is less than 100 μm thick.

2. The solid oxide fuel cell device of claim 1, wherein said at least one metal is Cr and said protective coating is $Al_2O_3$.

3. The solid oxide fuel cell device of claim 1, wherein said protective coating is 1 μm to 30 μm thick.

4. The solid oxide fuel cell device of claim 1, wherein said protective coating is 5 μm to 100 μm thick.

5. A solid oxide fuel cell device comprising:
   (a) zirconia based electrolyte;
   (b) at least one electrode situated on said electrolyte;
   (c) a non-electrically active component wherein the component is not in contact with electrodes and thereby not conductive and said component comprising at least one metal or metal oxide capable of at temperatures of above 625° C.,
      (i) migrating to the surface of said component, and
      (ii) being re-deposited on said at least one electrode; and
   (d) the electrolyte comprises an edge, said electrolyte edge situated over the non-electrically active component
   (e) a protective coating situated on at least one surface of said component, said coating substantially preventing said at least one metal or metal oxide from leaving the surface, of said component, which is situated under said protective coating, said protective coating also being substantially impermeable to oxygen wherein said at least one metal is Cr and said protective coating is selected from a group consisting of glass, zirconia and yttria-stabilized zirconia, oxides of magnesium, titanium and zinc wherein said protective coating is less than 100 μm thick.

6. The solid oxide fuel cell device of claim 5, wherein said coating is 1 μm to 100 μm, thick.

7. The solid oxide fuel cell device of claim 1, wherein at least 90% of the electrode surface area is not covered by the oxide of said at least one metal.

8. The solid oxide fuel cell device of claim 1, wherein said protective coating is a non-electrically conductive coating.

9. A solid oxide fuel cell device comprising:
   (a) zirconia based electrolyte;
   (b) at least one electrode situated on said electrolyte;
   (c) a non-electrically active component, wherein said component is a stainless steel metal frame not in contact with any electrodes and thereby not conductive, said metal frame comprising at least one metal which at temperatures of above 625° C., is capable of:
      (i) migrating to the surface of said frame,
      (ii) oxidizing; and
      (iii) being re-deposited in the oxide form on said at least one cathode;
   (d) the electrolyte comprises an edge, said electrolyte edge situated over the non-electrically act component wherein said protective coating is situated on said stainless steel frame, said coating substantially preventing said metal from leaving said metal frame, said protective coating being less than 100 μm thick and being substantially impermeable to oxygen.

10. The solid oxide fuel cell device of claim 9, wherein said coating is 1 μm to 100 μm thick.

11. The solid oxide fuel cell device of claim 9, said at least one metal is Cr.

12. The solid oxide fuel cell device of claim 11, wherein said coating is an electrically non-conductive coating with a thickness of 1 μm to 100 μm.

13. The solid oxide fuel cell device of claim 11, wherein at least 70% of the coating surface of said frame is not covered by chrome or $Cr_2O_3$.

14. The solid oxide fuel cell device of claim 11, wherein at least 85% of the coating surface of said frame is not covered by chrome or $Cr_2O_3$.

15. The solid oxide fuel cell device of claim 11, wherein at least 90% of the coating surface of said frame is not covered by chrome or $Cr_2O_3$.

16. The solid oxide fuel cell device of claim 9, wherein said metal frame has a coefficient of thermal expansion CTE of $10\times10^{-6}/°$ C. to $12.5\times10^{-6}/°$ C.

17. The solid oxide fuel cell device of claim 16, wherein said metal frame has a CTE of $11\times10^{-6}/°$ C. to $12\times10^{-6}/°$ C.

18. The solid oxide fuel cell device of claim 17, wherein said metal frame has a coefficient of thermal expansion CTE of $11.2\times10^{-6}/°$ C. to $11.7\times10^{-6}/°$ C.

19. The solid oxide fuel cell device of claim 9, wherein said protective coating is a non-electrically conductive coating and said metal frame is not an electrical connector.

20. A solid oxide fuel cell device according to claim 1 wherein said protective nonconductive coating situated on at least one surface of said component is covering at least one surface of said component and substantially preventing said at least one metal or metal oxide from leaving the surface of said component, which is situated under said protective coating.

21. The solid oxide fuel cell device of claim 1, wherein said solid oxide fuel cell device does not comprise a bipolar plate.

* * * * *